(12) United States Patent
Lee (10) Patent No.: US 12,140,254 B2
(45) Date of Patent: Nov. 12, 2024

(54) ADAPTIVE RETAINER

(71) Applicant: Illinois Tool Works Inc., Glenview, IL (US)

(72) Inventor: Joel R. Lee, Peotone, IL (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 17/986,581

(22) Filed: Nov. 14, 2022

(65) Prior Publication Data

US 2023/0213120 A1 Jul. 6, 2023

Related U.S. Application Data

(60) Provisional application No. 63/296,997, filed on Jan. 6, 2022.

(51) Int. Cl.
  *F16L 3/237* (2006.01)
  *F16M 13/02* (2006.01)
  *H02G 3/04* (2006.01)

(52) U.S. Cl.
  CPC ............ *F16L 3/237* (2013.01); *F16M 13/02* (2013.01); *H02G 3/0456* (2013.01)

(58) Field of Classification Search
  CPC ........... F16L 3/233; F16L 3/237; F16M 13/02
  USPC ............................................. 248/68.1; 24/455
  See application file for complete search history.

(56) References Cited

U.S. PATENT DOCUMENTS

| | | | |
|---|---|---|---|
| 3,913,187 A | 10/1975 | Okuda | |
| 6,164,605 A * | 12/2000 | Drake | F16L 3/1075 |
| | | | 24/339 |
| 6,266,852 B1 | 7/2001 | Tai | |
| 6,305,055 B1 | 10/2001 | Castro | |
| 6,974,292 B2 | 12/2005 | Hansen | |
| 6,978,973 B1 | 12/2005 | Gretz | |
| 7,178,203 B2 | 2/2007 | Pearson | |
| 8,402,605 B2 | 3/2013 | Courtin | |
| 8,613,128 B2 | 12/2013 | Moerke | |
| 8,827,214 B2 | 9/2014 | Ogawa | |
| 9,004,545 B2 | 4/2015 | Whitaker | |
| 9,475,525 B2 | 10/2016 | Lepper | |
| 9,963,087 B2 | 5/2018 | Leverger | |
| 9,982,694 B2 | 5/2018 | Scroggie | |
| 10,018,214 B2 | 7/2018 | Yon | |
| 10,125,906 B2 | 11/2018 | Whitaker | |
| 10,273,996 B2 | 4/2019 | Whitaker | |
| 10,385,901 B2 | 8/2019 | Steltz | |

(Continued)

OTHER PUBLICATIONS

PCT, International Search Report and Written Opinion regarding PCT Application No. PCT/US2022/050124, dated Mar. 10, 2023, 15 pages.

*Primary Examiner* — Todd M Epps
(74) *Attorney, Agent, or Firm* — McAndrews, Held & Malloy, Ltd.

(57) ABSTRACT

Disclosed is a ratcheting retainer for securing one or more objects, such as wire bundles, to a component. The ratcheting retainer includes a ratchet strap assembly, a fastener, and retainer clip. The ratchet strap assembly, which can adjust in diameter, circumscribes and secures a first object. The fastener is coupled to the ratchet strap assembly and secures the ratcheting retainer to the component. The retainer clip is coupled to the ratchet strap assembly and secures a second object to the ratchet strap assembly.

20 Claims, 13 Drawing Sheets

(56) References Cited

U.S. PATENT DOCUMENTS

| | | |
|---|---|---|
| 10,753,380 B2 | 8/2020 | Tuthill |
| 10,859,192 B2 | 12/2020 | Whitaker |
| 2006/0191111 A1* | 8/2006 | Pearson ................. F16L 3/137 24/16 PB |
| 2016/0061356 A1* | 3/2016 | Raymond ................ H02G 3/32 24/458 |
| 2019/0234535 A1* | 8/2019 | Reznar ................ F16C 11/0657 |
| 2020/0232495 A1 | 7/2020 | Lepper |

* cited by examiner

ADAPTIVE RETAINER

CROSS-REFERENCE

The present application claims priority to U.S. Provisional Patent Application No. 63/296,997, filed Jan. 6, 2022, and entitled "Variable Convolute Adaptive Retainer," which is hereby incorporated by reference in its entirety.

BACKGROUND

Automotive components require fastening techniques that are simple to manufacture and assemble. Further, fastening techniques should above all be reliable and efficient. In some cases, it is desirable to efficiently attach one or more objects of various diameters, such as wire bundles and convolute sleeves, to a vehicular structure. For example, wires and wire bundles are sometimes wrapped in a flexible, light weight corrugated tubing generally known as convolute tubes.

Most existing solutions are limited in adjustability and, therefore, unable to retain objects of varying diameters. As a result, multiple clip designs are fabricated to address different diameters. Such additional components, however, result in higher plant complexity and additional part numbers. Existing solutions that are able to retain and adjust to accommodate objects of varying diameters, such as a straps and zip ties, require tooling for proper retention and also result in an additional step to trim the excess material during assembly. Such trimming results in a waste of both material and time. The metal products are heavy, more expensive, and require installation tools on the assembly line, such as screw drivers to tighten. Finally, existing plastic solutions, while lighter weight than metal, tend droop or sag when attaching larger objects.

Therefore, it would be highly desirable to provide an improved, lightweight retainer to rigidly assemble objects, such as wires and tubes, in place while accommodating and retaining objects of varying diameters.

SUMMARY

The present disclosure relates generally to a retainer for attaching objects of various diameters, substantially as illustrated by and described in connection with at least one of the figures, as set forth more completely in the claims.

DRAWINGS

The foregoing and other objects, features, and advantages of the devices, systems, and methods described herein will be apparent from the following description of particular examples thereof, as illustrated in the accompanying figures; where like or similar reference numbers refer to like or similar structures. The figures are not necessarily to scale, emphasis instead being placed upon illustrating the principles of the devices, systems, and methods described herein.

DESCRIPTION

References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Recitation of ranges of values herein are not intended to be limiting, referring instead individually to any and all values falling within and/or including the range, unless otherwise indicated herein, and each separate value within such a range is incorporated into the specification as if it were individually recited herein. In the following description, it is understood that terms such as "first," "second," "top," "bottom," "side," "front," "back," and the like are words of convenience and are not to be construed as limiting terms. For example, while in some examples a first side is located adjacent or near a second side, the terms "first side" and "second side" do not imply any specific order in which the sides are ordered.

The terms "about," "approximately," "substantially," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the disclosure. The use of any and all examples, or exemplary language ("e.g.," "such as," or the like) provided herein, is intended merely to better illuminate the disclosed examples and does not pose a limitation on the scope of the disclosure. The terms "e.g.," and "for example" set off lists of one or more non-limiting examples, instances, or illustrations. No language in the specification should be construed as indicating any unclaimed element as essential to the practice of the disclosed examples.

The term "and/or" means any one or more of the items in the list joined by "and/or." As an example, "x and/or y" means any element of the three-element set $\{(x), (y), (x, y)\}$. In other words, "x and/or y" means "one or both of x and y". As another example, "x, y, and/or z" means any element of the seven-element set $\{(x), (y), (z), (x, y), (x, z), (y, z), (x, y, z)\}$. In other words, "x, y, and/or z" means "one or more of x, y, and z."

In one example, a ratcheting retainer comprises: a ratchet strap assembly configured to define a strap opening to circumscribe and secure a first object, wherein the ratchet strap assembly is configured to adjust in diameter; a fastener coupled to the ratchet strap assembly and configured to secure the ratcheting retainer to a component; and a retainer clip coupled to the ratchet strap assembly and configured to secure a second object to the ratchet strap assembly.

In some examples, the fastener projects outwardly from the ratchet strap assembly and/or the retainer clip projects outwardly from the ratchet strap assembly. In some examples, the fastener is one or more of a push-pin fastener, a W-type fastener, and a box-prong fastener. In some examples, the fastener, the retainer clip, and the ratchet strap assembly are a unitary structure. In some examples, the fastener, the retainer clip, and the ratchet strap assembly are fabricated using an additive manufacturing technique.

In some examples, the ratchet strap assembly comprises a strap portion, a ring portion, and a ratchet coupler configured to connect the strap portion and the ring portion. The strap portion can comprise a flex strap and a plurality of strap teeth formed in or on the flex strap. The ratchet coupler can be coupled to the ring portion and configured to engage the plurality of strap teeth via a pawl. In some examples, the pawl includes at least one snap tooth configured to engage one or more of the plurality of strap teeth.

In some examples, the ratchet coupler includes a push tab. In some examples, the ratchet strap assembly comprises a containment leg defining a passageway through which the strap portion can pass when assembled. In some examples, the containment leg is coupled to the ring portion.

The ratcheting retainer disclosed herein offers a number of benefits over existing retainers. For example, the ratcheting retainer can robustly fasten objects of various diameters, such as wire bundles and convolute sleeves. In addition, the ratcheting retainer can provide opposing grip features (e.g., push tabs) to enable one-handed assembly. Further, in some examples, the ratcheting retainer further comprises one or more retainer clips (e.g., arranged as a "buddy" or "piggy back" clip) to secure additional objects. Yet further, the described ratcheting retainer does not materially obstruct the fastened objects, whether a wire bundle or convolute sleeve, thus allowing for servicing of the fastened objects with common tools. Finally, the ratcheting retainer can be fabricated from a lightweight plastic to reduce weight and cost.

Figure 1A:
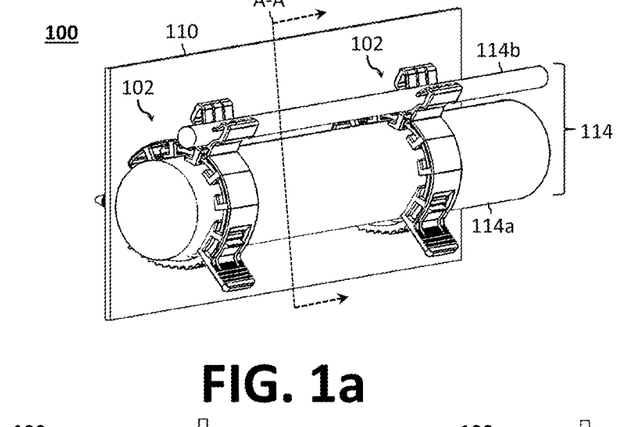
FIG. 1a illustrates an isometric view of the ratcheting system in accordance with an aspect of this disclosure.
Figure 1B:
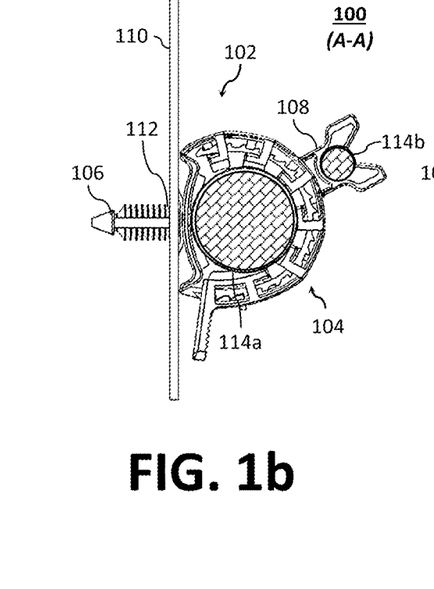
FIGS. 1b through 1d illustrate cross-sectional views taken along cutline A-A of the ratcheting system.
Figure 1C:
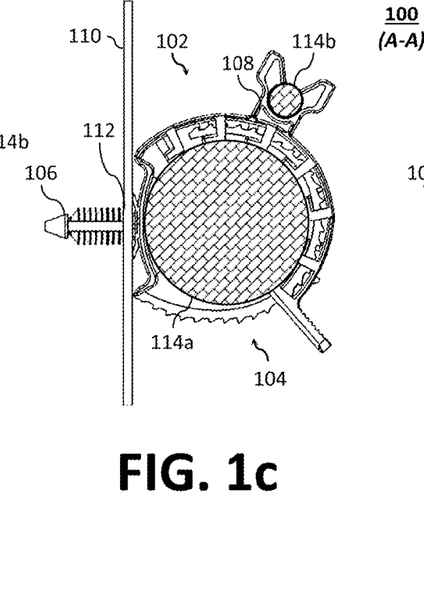
Figure 1D:
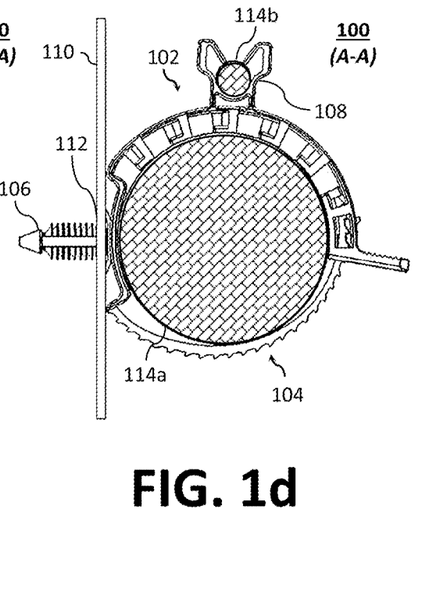

FIGS. 1a through 1d a ratcheting system 100 having a pair of ratcheting retainers 102 in an installed condition. Specifically, FIG. 1a illustrates an isometric view of the ratcheting system 100, while FIGS. 1b through 1d illustrate cross-sectional views taken along cutline A-A of the ratcheting system 100. Each of the pair of ratcheting retainers 102 generally comprises a ratchet strap assembly 104, a fastener 106, and a retainer clip 108. In the illustrated example, each of the fastener 106 and the retainer clip 108 are formed in or on the ratchet strap assembly 104. The fastener 106 serves to attach or secure the ratcheting retainer 102 to a component 110 having an opening 112 formed therein, while the retainer clip 108 and the ratchet strap assembly 104 are each configured to secure and retain an object 114.

Each of the illustrated ratcheting retainers 102 is configured to mount two objects 114 to the component 110 or, in some cases, more than two objects 114. The two objects 114 are illustrated as a first object 114a having a first diameter and a second object 114b having a second diameter that is less than the first diameter. As best illustrated in FIGS. 1b through 1d, each of the ratcheting retainers 102 is configured to accommodate and encircle (or otherwise circumscribe) first objects 114a of different diameters via an adjustable ratcheting mechanism, the details of which will be discussed in connection with FIGS. 2a through 2h.

Depending on the application, the illustrated ratcheting retainer 102 may be fabricated from, for example, synthetic or semi-synthetic polymers (e.g., plastics, such as acrylonitrile butadiene styrene (ABS) and polyvinyl chloride (PVC), etc.), composite materials (e.g., fiber glass), or a combination thereof. In some examples, the ratcheting retainer 102 (or portion thereof) is fabricated from metal (or a metal alloy). In some examples, the ratchet strap assembly 104, the fastener 106, and the retainer clip 108 may be formed as a unitary structure. For example, the ratchet strap assembly 104, the fastener 106, and the retainer clip 108 may be fabricated as a single component via a plastic injection process. In another example, the ratchet strap assembly 104, the fastener 106, and the retainer clip 108 may a printed thermoplastic material component that can be printed with great accuracy and with numerous details, which is particularly advantageous, for example, in creating components requiring complex and/or precise features. Additive manufacturing techniques obviate the need for mold tooling typically associated with plastic injection molding, thereby lowering up-front manufacturing costs, which is particularly advantageous in low-volume productions. In some examples, the fastener 106 may be fabricated with the component 110 using material extrusion (e.g., fused deposition modeling (FDM)), stereolithography (SLA), selective laser sintering (SLS), material jetting, binder jetting, powder bed fusion, directed energy deposition, VAT photopolymerisation, and/or any other suitable type of additive manufacturing/3D printing process. In some examples, the ratchet strap assembly 104, the fastener 106, and the retainer clip 108 may be formed or otherwise fabricated at different resolutions during a printing operation.

The component 110 may be, for example, a panel (e.g., an automotive panel), frame (e.g., an automotive frame), or other structural components. Depending on the application, the component 110 may be fabricated from, for example, metal (or a metal alloy), synthetic or semi-synthetic polymers (e.g., plastics, such as acrylonitrile butadiene styrene (ABS) and polyvinyl chloride (PVC), etc.), composite materials (e.g., fiber glass), or a combination thereof.

The objects 114 are illustrated as having a generally circular outer surface. The objects 114 may be, for example, wires, wire bundles, convolute sleeves, tubes, hoses, or the like. For example, in an electric vehicle, the objects 114 may include one or more cable bundles that can be secured to the component 110 via the ratcheting retainer 102. In other examples, the objects 114 may be fluid lines (e.g., coolant lines, fuel lines, brake lines, HVAC lines, etc.). While only two objects 114 are illustrated (i.e., first object 114a and second object 114b), additional objects 114 can be secured to the component 110 via the ratcheting retainer 102. For example, where three (or more) objects 114 are to be secured to the component 110, a first object 114a may be secured via the ratchet strap assembly 104, a second object 114b may be secured via the retainer clip 108, and a third object (not illustrated) may be secured via another retainer formed in or on the ratchet strap assembly 104 (similarly to retainer clip 108).

In some examples, the ratcheting system 100 may comprises a seal at or around the fastener 106 and positioned between the component 110 and the ratcheting retainer 102 post-installation. For example, a seal may be used where it is desirable to mitigate dust, dirt, and/or moisture penetration through the opening 112. The seal may be embodied as a ring (e.g., an annulus) and fabricate from foam material, thermoplastic, rubber, etc. For example, a seal can be configured to fit over the distal end of the fastener 106 to surround a portion of the fastener 106 (e.g., the shank or other body portion) between the component 110 and the ratcheting retainer 102.

Figure 2A:
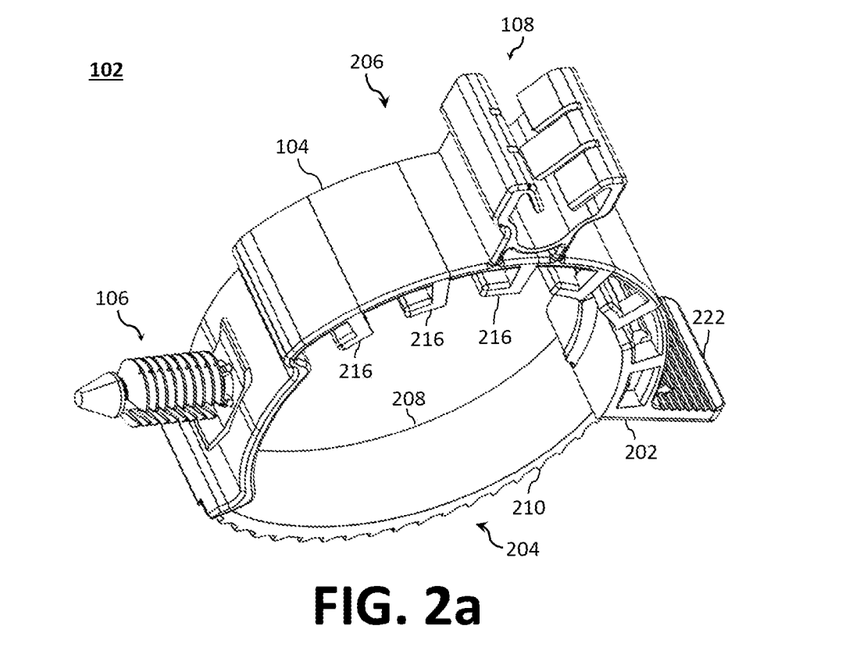
FIGS. 2a and 2b illustrate, respectively, top and bottom isometric views of the ratcheting retainer in accordance with an aspect of this disclosure.
Figure 2B:
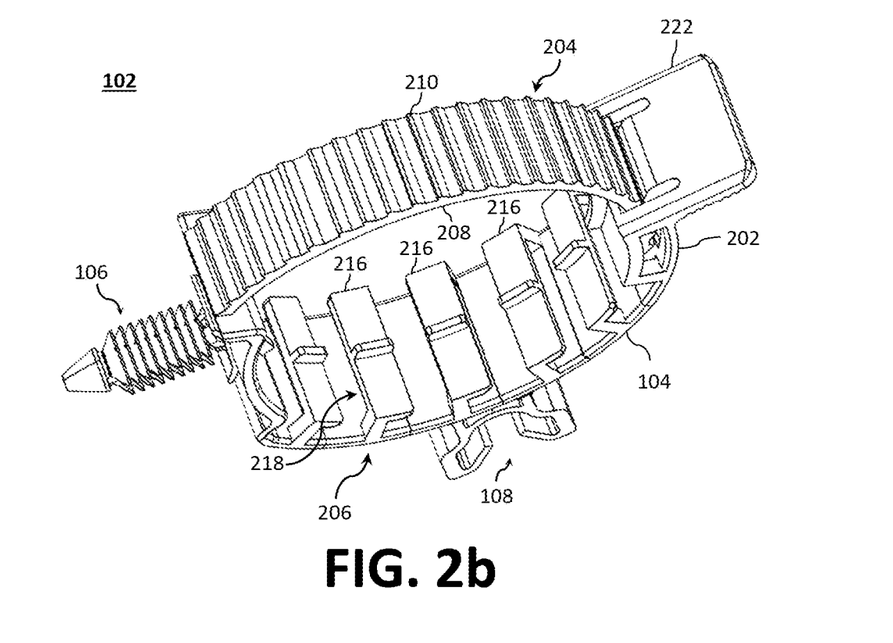
Figure 2C:
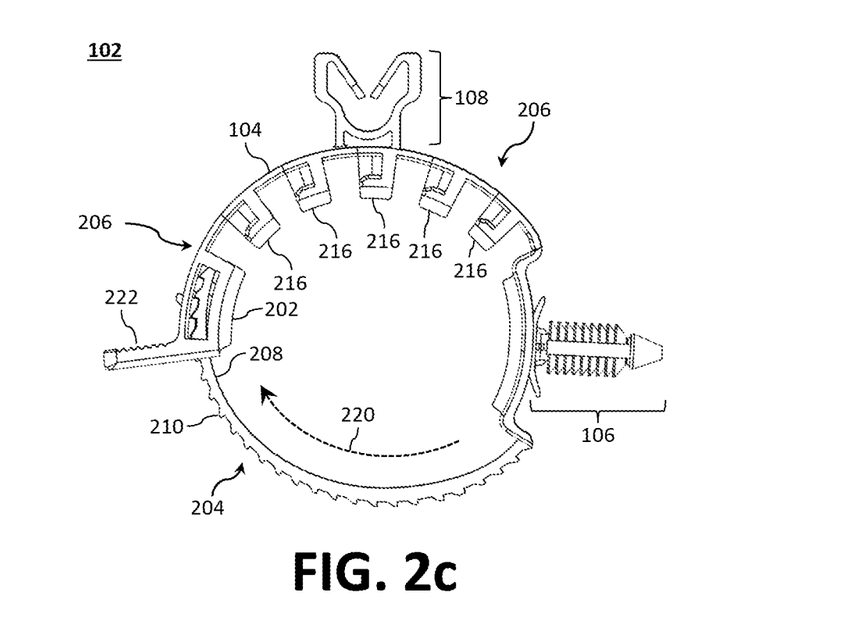
FIGS. 2c and 2d illustrate, respectively, top and bottom top plan views of the ratcheting retainer.
Figure 2D:
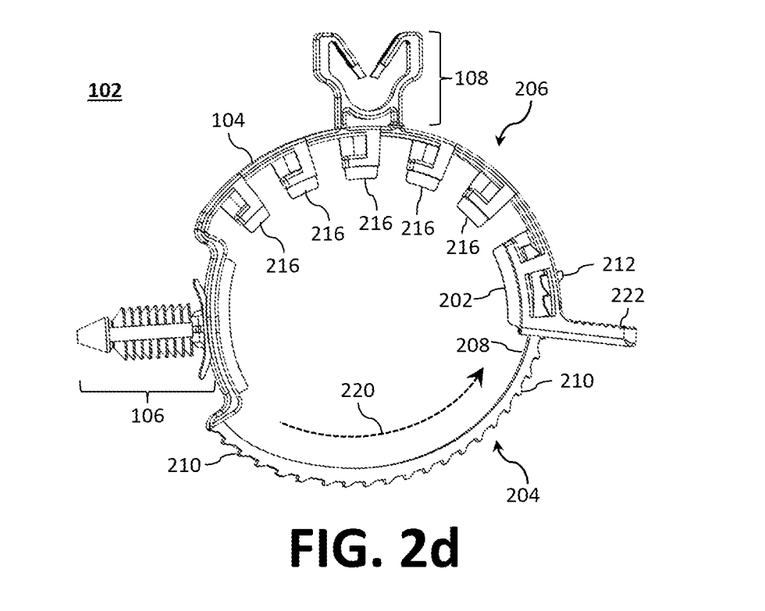
Figure 2E:
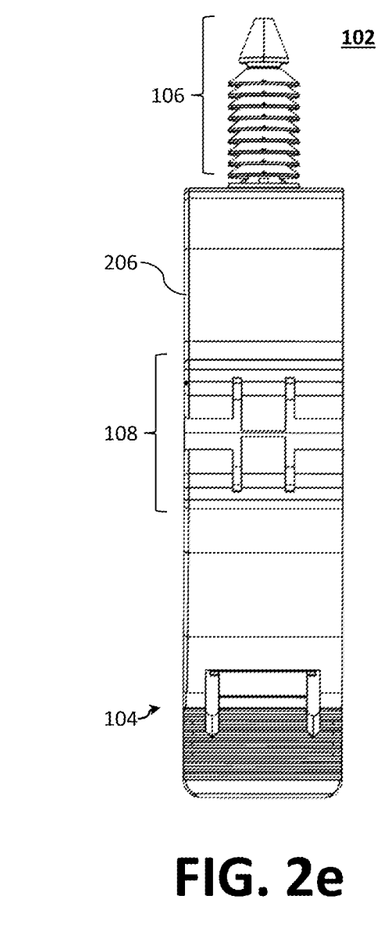
FIGS. 2e through 2h illustrate first, second, third, and fourth side views of ratcheting retainer.
Figure 2F:
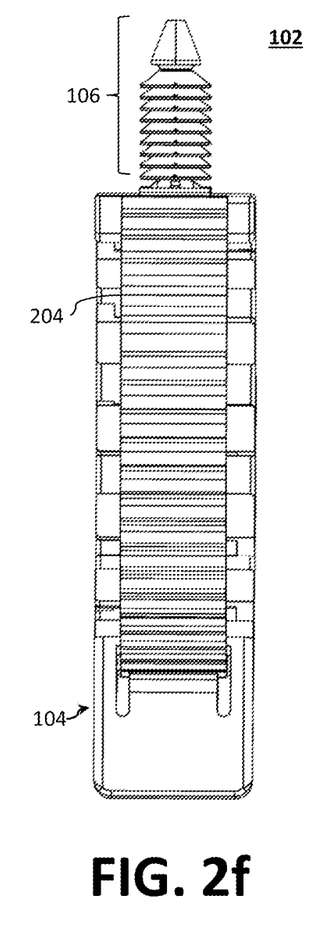
Figure 2G:
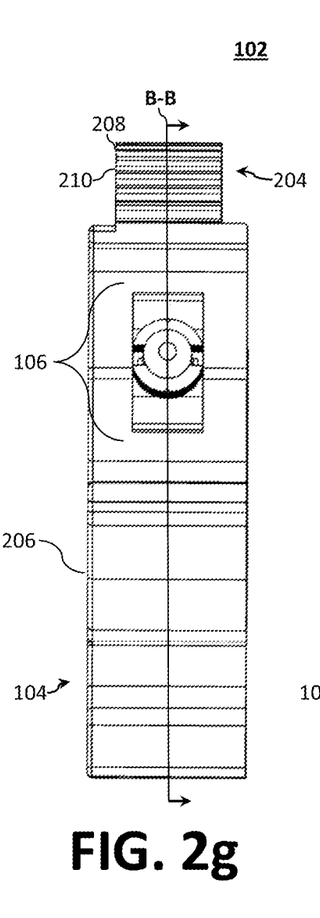
Figure 2H:
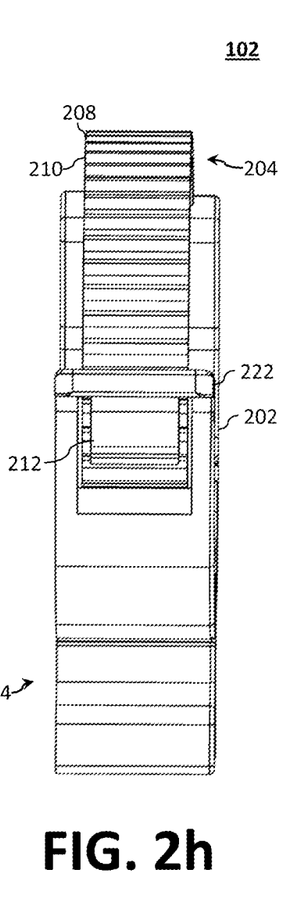

FIGS. 2a through 2h illustrate a ratcheting retainer 102 in accordance with an aspect of this disclosure. The ratcheting retainer 102 is illustrated in a closed, but pre-installed condition. Specifically, FIGS. 2a and 2b illustrate, respectively, top and bottom isometric views of the ratcheting retainer 102, while FIGS. 2c and 2d illustrate, respectively, top and bottom top plan views of the ratcheting retainer 102. FIGS. 2e through 2h illustrate first, second, third, and fourth side views of ratcheting retainer 102. As noted above, the ratcheting retainers 102 generally comprises the ratchet strap assembly 104, the fastener 106, and the retainer clip 108.

The ratcheting retainer 102 includes a ratchet coupler 202 configured to connect a strap portion 204 and a ring portion 206 via, for example, a ratcheting mechanism. FIGS. 3c and 3d illustrate, respectively, cross-sectional side and perspective views taken along cutline B-B of ratchet coupler 202 to better illustrate the components of the resulting ratcheting mechanism. In the illustrated example, the ring portion 206 includes or otherwise defines the ratchet coupler 202. The strap portion 204 includes a flex strap 208 that includes a plurality of strap teeth 210 distributed on at least on sides of the flex strap 208. In the illustrated example, the plurality of strap teeth 210 are oriented in an outward direction (i.e., away from the first object 114a when installed). A distal end of the flex strap 208 is configured to be inserted into the ratchet coupler 202 positioned at the ring portion 206. The flex strap 208 can be progressed until the strap opening of the ratcheting retainer 102 achieves the desired diameter, which would be dictated by, and generally correspond to, the outer diameter of the first object 114a. The ratcheting mechanism uses an inwardly biased pawl 212 having one or more snap teeth 214 (i.e., at least one snap tooth 214). The illustrated inwardly biased pawl 212 is located on the ratchet coupler 202 and is configured to engage and/or mate with the plurality of strap teeth 210. As best illustrated in Details D and E of FIGS. 3d and 3e, the shape of the snap teeth 214 on the pawl 212 is substantially complimentary to the shape of the strap teeth 210 on the flex strap 208. As the strap portion 204 is inserted into the ratchet coupler 202, the strap teeth 210 engage the snap teeth 214. To release the engagement, a force can be applied to the push tab 222 as indicated by arrow 322 to disengage the snap teeth 214 from the strap teeth 210.

The ring portion 206 further includes a plurality of containment legs 216 positioned at its inner surface and oriented in an inward direction (i.e., toward the first object 114a when installed). Each of the plurality of containment legs 216 defines a passageway 218 to receive and retain the distal and/or free end of the strap portion 204 when assembled. The plurality of containment legs 216 enable the strap portion 204 to move in the direction indicated by arrow 220 during tightening of the ratchet strap assembly 104 without becoming obstructed by the first object 114a. FIGS. 3e and 3f illustrate detailed perspective views of the plurality of containment legs 216. As illustrated, each of the containment leg 216 generally comprises a pair of vertical portions 302 (e.g., sidewalls) and a bridging portion 304 (e.g., a cap) connecting the pair of vertical portions 302 to define the passageway 218 through which the strap portion 204 can pass.

The inner leading edge 326 of the bridging portion 304 may be shaped with angle (e.g., rounded) to accommodate the collapsing diameter and maintain low installation forces and smooth feel. In some examples, the bridging portion 304 can include an inwardly oriented projection 224 the contact and secure the first object 114a. For example, when a convolute tube is secured via the ratcheting retainer 102, the inwardly oriented projection 224 can engage a groove formed on the outer surface of the convolute tube to mitigate lateral movement (e.g., sliding). Thus, as the flex strap 208 is inserted into the ratchet coupler 202, the flex strap 208 is contained and free from contact with outside interference via the containment legs 216. When the strap portion 204 and ring portion 206 are connected, the ratcheting retainer 102 is configured to circumscribe and firmly secure objects having a range of diameters. Typically, the distance the strap portion 204 can be inserted into the ring portion 206 will be limited by the outer diameter of the object on which the ratcheting retainer 102 is being mounted.

As illustrated, a push tab 222 can be formed on the ratchet coupler 202 to improve the user's grip when tightening the ratcheting retainer 102. The inclusion of the push tab 222 allows the user of the ratcheting retainer 102 to more readily apply a force to close the ratcheting retainer 102. Therefore, the push tab 222 can be located at the end of ring portion 206 so as to minimize the distance between push tab 222 and fastener 106 and to facilitate the insertion of the strap portion 204 into the ring portion 206. The push tab 222 and other grip features enable, inter alia, one-handed assembly.

During the insertion of the strap portion 204, guide features serve to reduce friction for low force installation and a smooth feel to the user. In one example, the end of the flex strap 208 includes a chamfer to aid in ensuring the flex strap 208 will readily insert into the ratchet coupler 202 in the desired manner. Further, configuring the ratcheting retainer 102 to provide an interference fit at the ratchet coupler 202 assists in helping to ensure the strap teeth 210 and pawl 212 engage each other. In such an interference fit configuration, the chamfer is beneficial in allowing the strap portion 204 to be readily inserted into the ring portion 206.

Figure 3A:
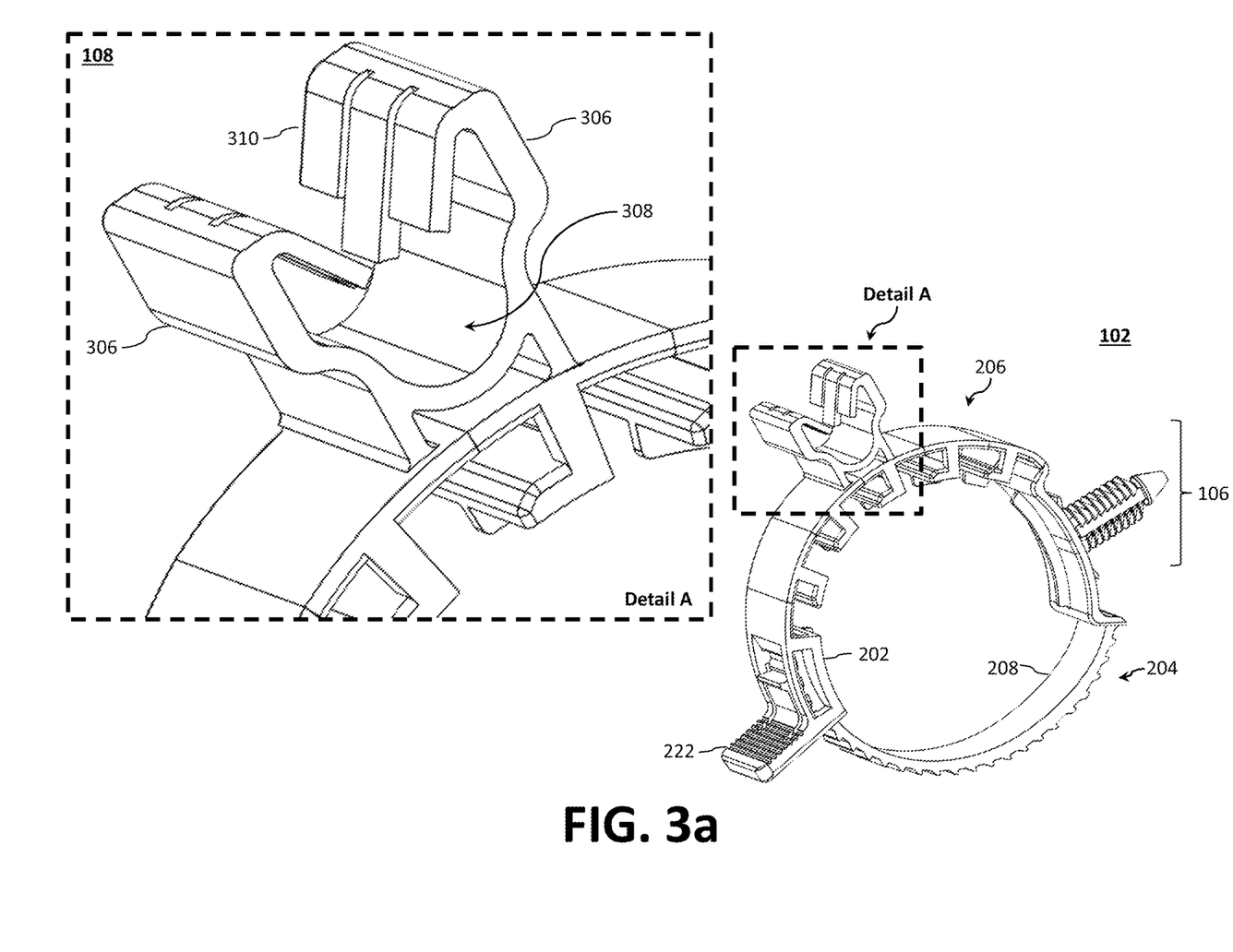
FIG. 3a illustrates a detailed perspective view of an example retainer clip.
Figure 3B:
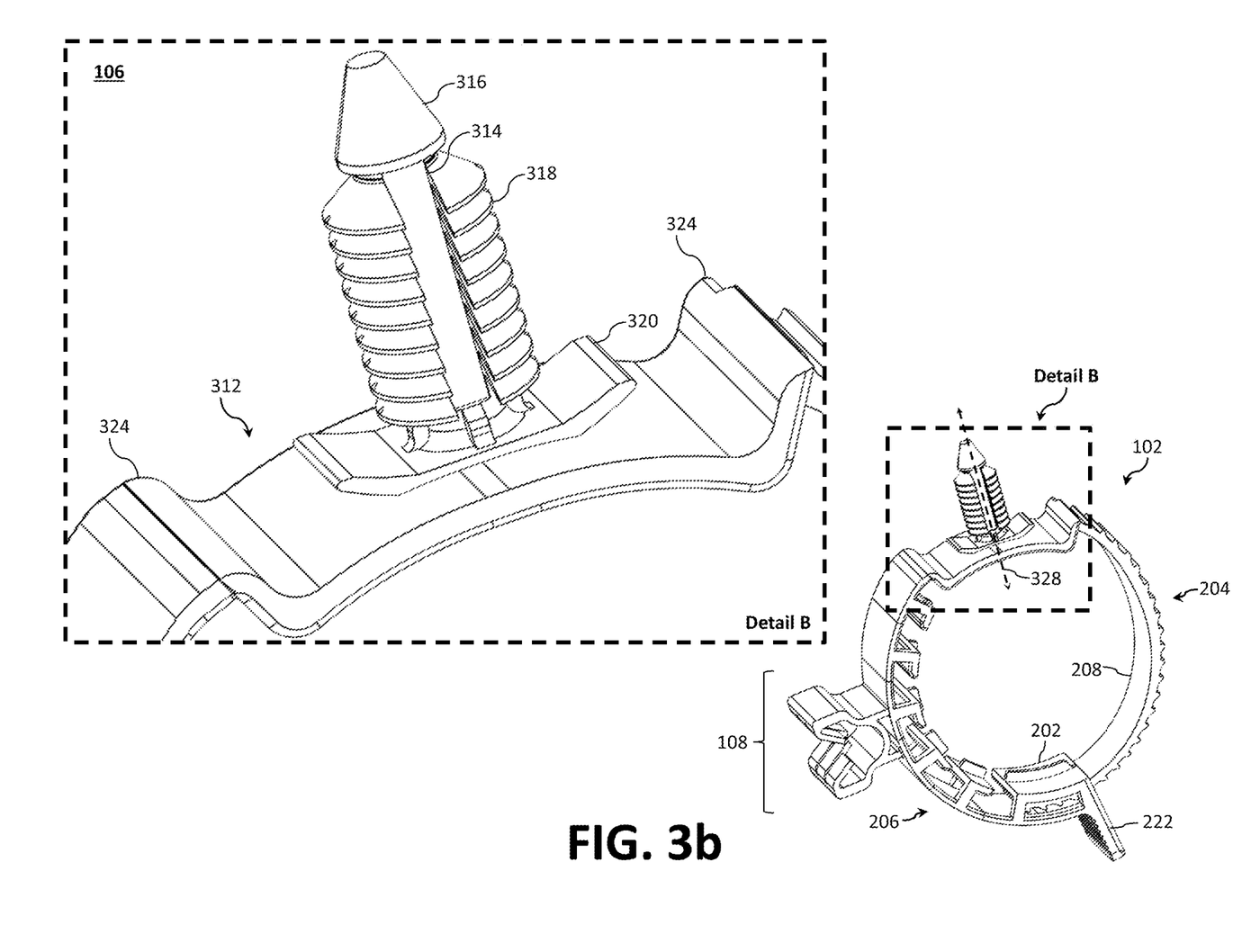
FIG. 3b illustrates a detailed perspective view of an example fastener.
Figure 3C:
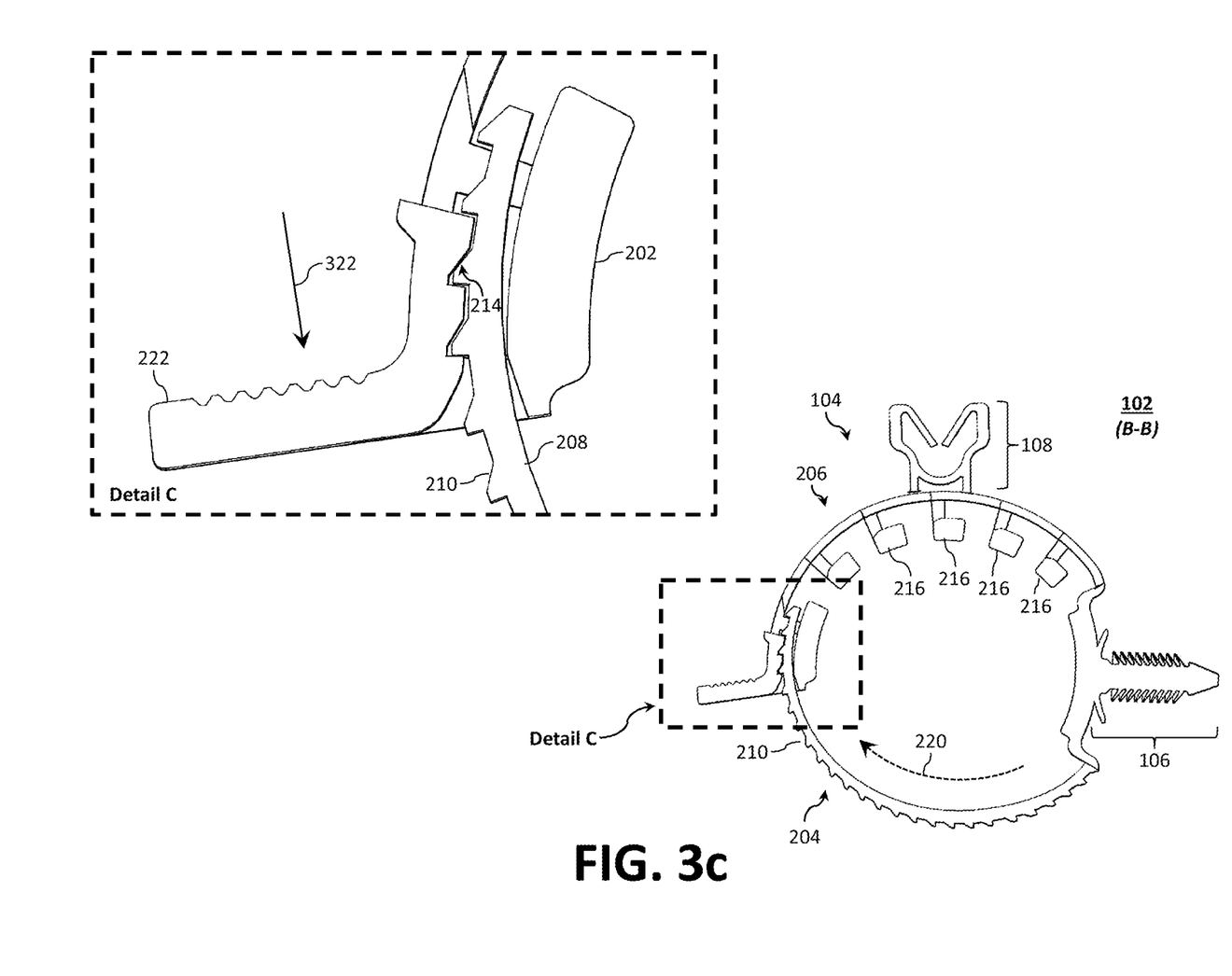
FIGS. 3c and 3d illustrate, respectively, detailed cross-sectional side and perspective views taken along cutline B-B of ratchet coupler.
Figure 3D:
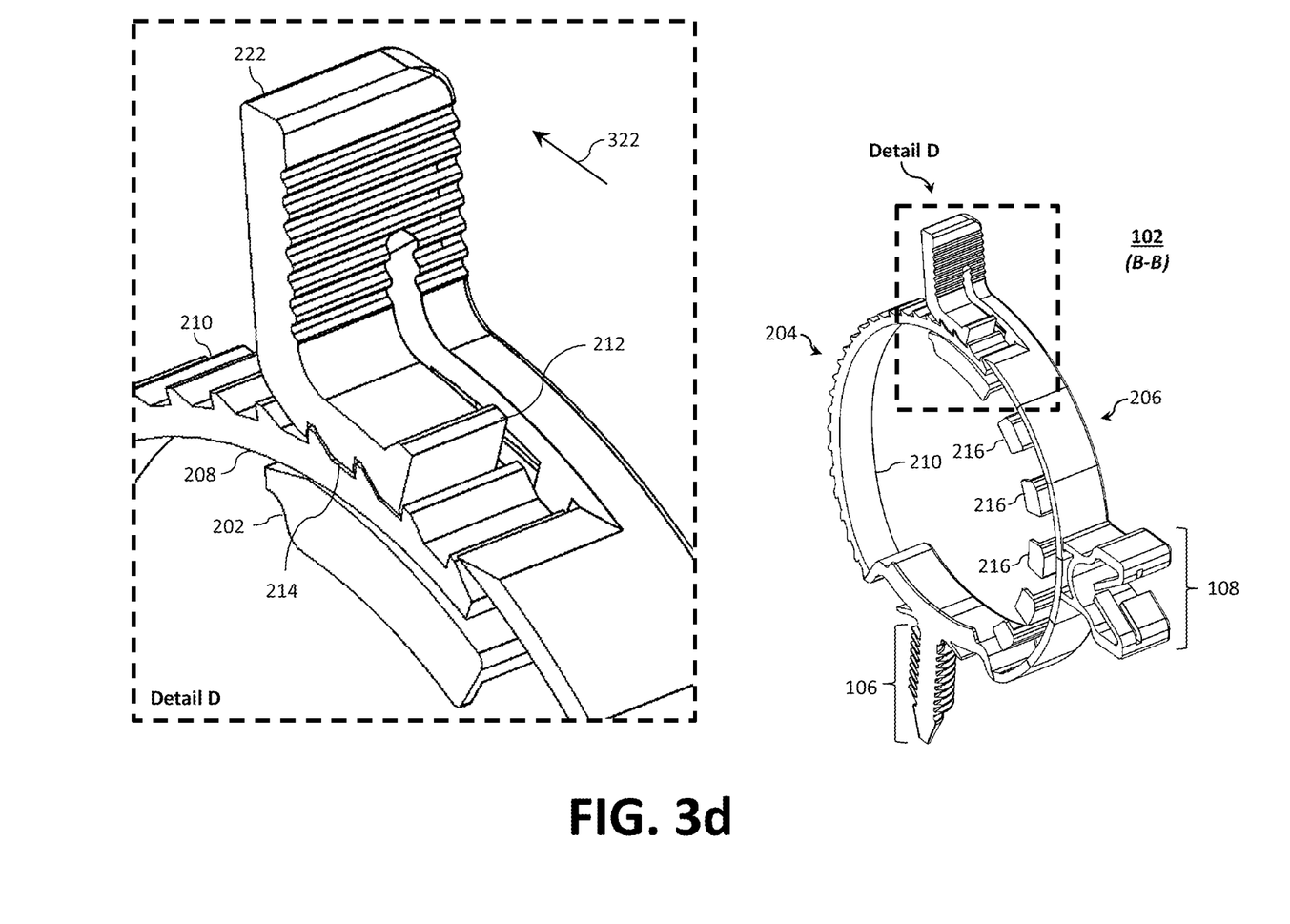
Figure 3E:
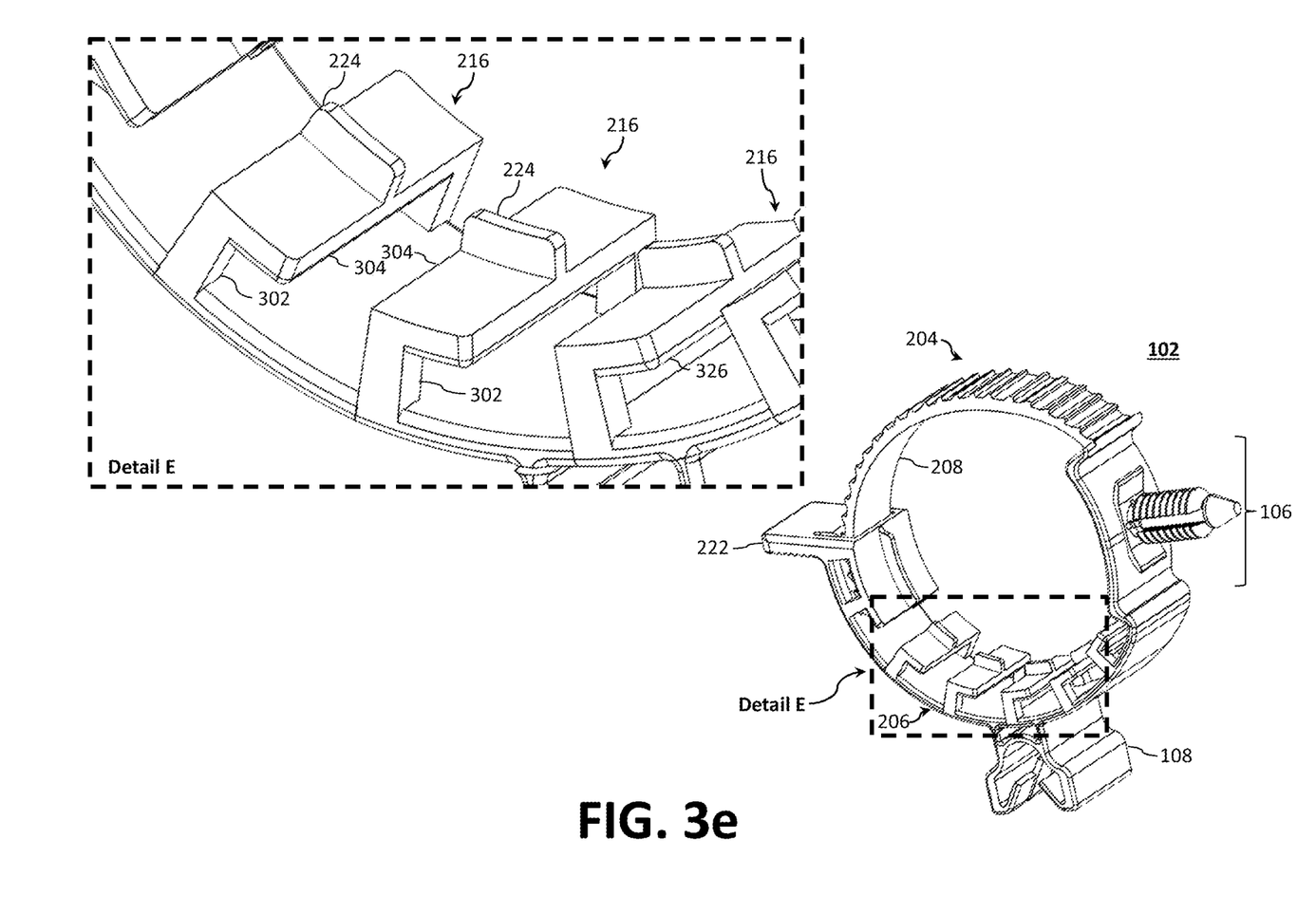
FIGS. 3e and 3f illustrate detailed perspective views of a plurality of containment legs.
Figure 3F:
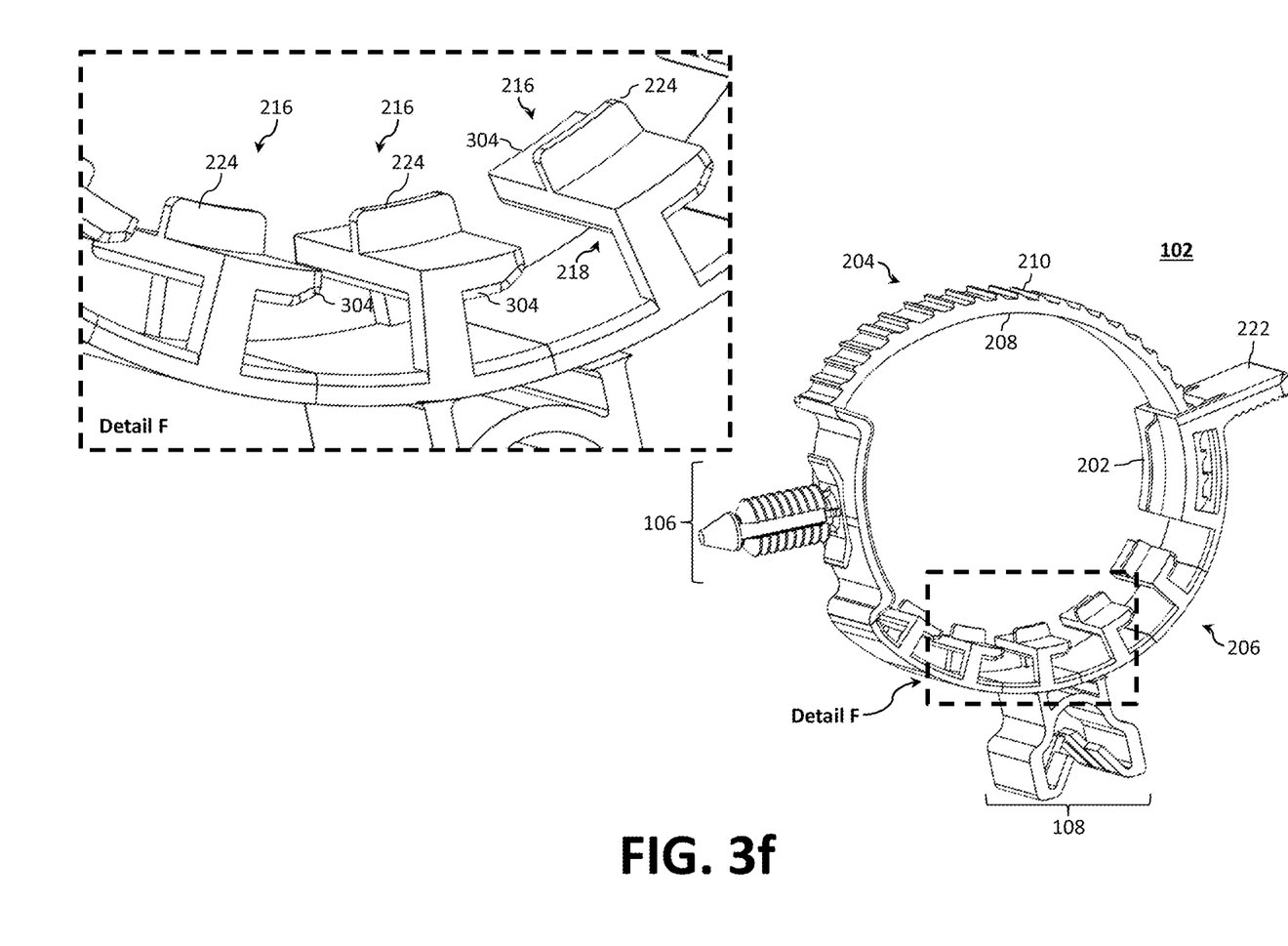
Figure 3G:
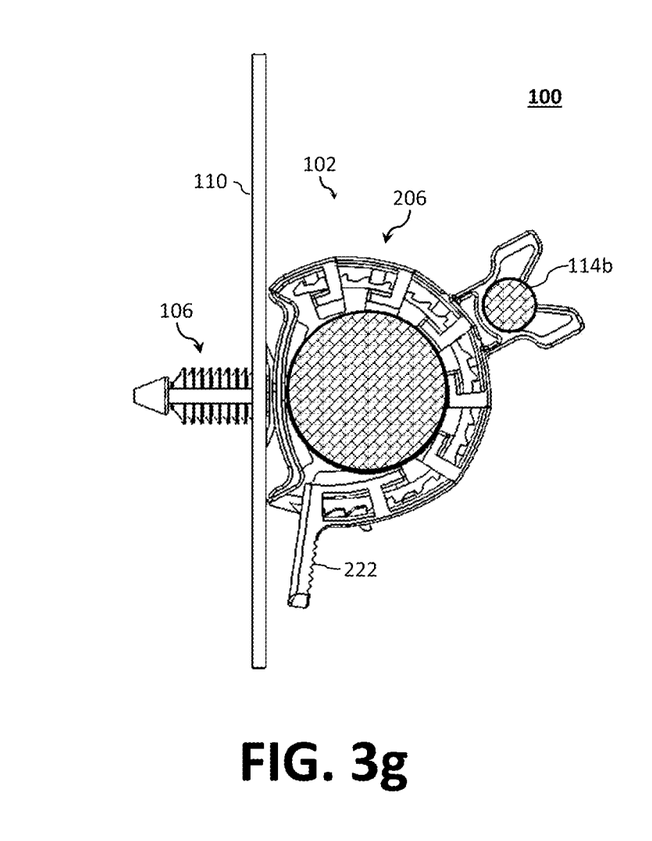
FIGS. 3g and 3h illustrate the plurality of containment legs accommodating the strap portion with first objects of different diameters.
Figure 3H:
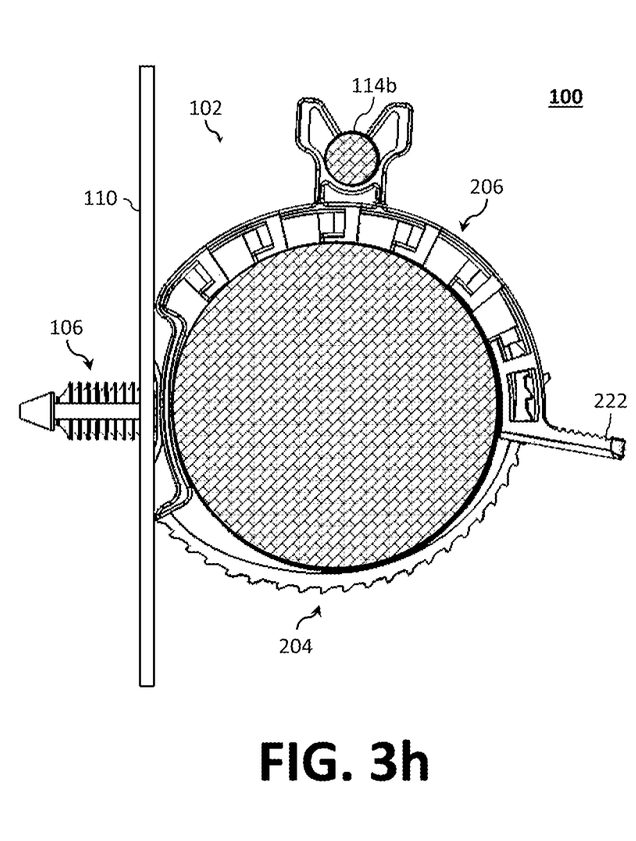

FIG. 3a illustrates a detailed perspective view of an example retainer clip 108, while FIG. 3b illustrates a detailed perspective view of an example fastener 106. With reference to FIG. 3a, the retainer clip 108 generally comprises a pair of vertical, spaced walls 306 that define a channel 308 therebetween. The channel 308 is sized to generally correspond to the size of the second object 114b. The distal ends of the walls 306 includes one or more retention fingers 310. For examples, the one or more retention fingers 310 are illustrated as downwardly oriented such that they push the second object 114b into the channel 308. That is, the one or more retention fingers 310 are can be downwardly oriented such that they are directed toward the base of the channel 308 and/or about 45 degrees relative to the wall 306 to which it is attached.

While the retainer clip 108 is illustrated as a push-in type retainer clip, other retainers are contemplated, such as fold-over tube retainers (e.g., having a hinged portion to fold over and secure the second object 114b in the channel 308), clamps, etc. In some examples, a retainer similar to the ratchet strap assembly may be used to secure the second object 114b relative to the ratcheting retainer 102. For example, a second ratcheting retainer may be formed in or on the ratcheting retainer 102 in addition to or in lieu of the illustrated retainer clip 108. In such an example, the second ratcheting retainer may be scaled down in size when the second object 114b is smaller and/or lighter weight.

The ratchet strap assembly 104 can be shaped to define a recessed portion 312 from which the fastener 106 projects. The recessed portion 312 allows for the ratcheting retainer 102 to be more closely mounted to the component 110 when installed, thus minimizing gaps and mitigating wobble of the ratcheting retainer 102 relative to the component 110. Further, a protruding shoulder feature 324 can be formed at each end of the recessed portion 312 to mitigate rocking and provide a rigid feel after installation of ratcheting retainer 102 into component 110.

As best illustrated in FIG. 3b, the illustrated fastener 106 generally comprises a shank 314, a head 316, and one or more retention features 318. For example, the fastener 106 can be a push-pin fastener (sometimes called trees, pine trees, Christmas trees, etc.) that includes retention features 318 composed of a plurality of fins arranged along a length of the shank 314. The shank 314, head 316, and one or more retention features 318 are configured secure the ratcheting retainer 102 to the component 110 via, for example, the opening 112. The fins may be shaped as blades, teeth, barbs, or the like. As illustrated, the fins are angled away from the central longitudinal axis 328 of the shank 314 and are configured to deflect inward toward the central longitudinal axis 328 as an end of the fastener 106 is passed through the opening 112 in the component 110. The fins are angled upwardly relative to the central longitudinal axis 328 to resist pullout force. In some examples, the fastener 106 may include additional features, such as ribs and/or wings 320 to mitigate noise and/or rattle between the component 110 and the ratcheting retainer 102.

Figure 4A:
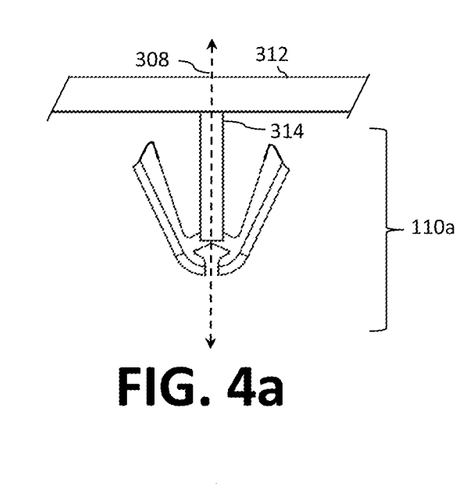
FIGS. 4a through 4f illustrate, respectively, a W-type fastener, a pin and grommet (P&G) fastener, a box-prong fastener, a specialty fastener, a clip assembly with four retaining legs, and a clip assembly with two snap-engaging seats.
Figure 4B:
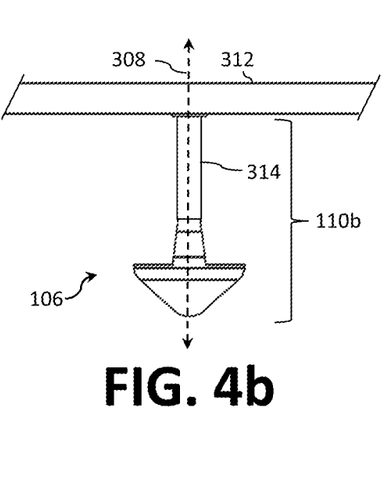
Figure 4C:
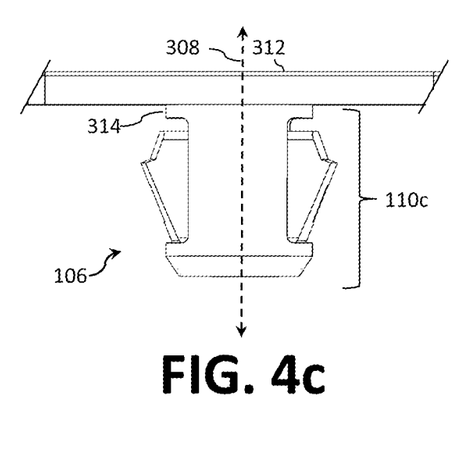
Figure 4D:
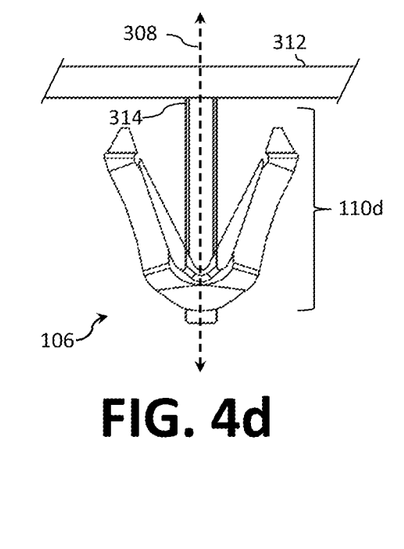
Figure 4E:
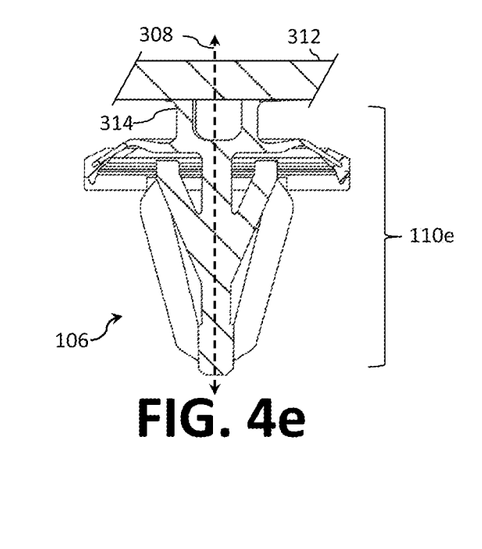
Figure 4F:
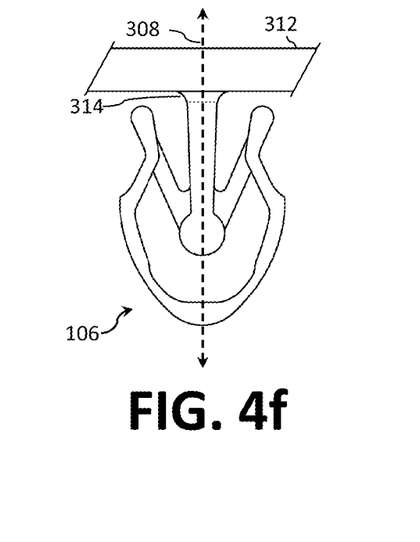

Those of skill in the art would appreciate that the described features and principles may be used with various types of fasteners 106. Therefore, while a push-pin fastener is described primarily, other forms of fasteners are contemplated, example of which are illustrated and described in connection with FIGS. 4a through 4f. Specifically, FIGS. 4a through 4f illustrate additional forms of retention features 318 suitable for coupling the ratcheting retainer 102 with the component 110, including a W-type fastener 110a, a pin clip 110b, a box-prong fastener 110c (illustrated as a 2-legged box-prong fastener), a specialty clip assembly 110d (e.g., a CenterLok™ fastener, which is available from Deltar®), a clip assembly with four retaining legs 110e, and a clip assembly with two snap-engaging seats 110f. The pin clip 110b can be provided to serve as a reusable fastener having a low insertion value that may be used with a grommet. The pin clip 110b includes a retention feature having a pin head positioned at a distal end of the shank 314. The pin clip 110b may be configured, for example, as a single position fastener or a multi-position fastener. The clip assembly with four retaining legs 110e, which is illustrated in FIG. 4e as a cross sectional view, is further described in connection with commonly-owned U.S. Pat. No. 10,385,901 to Jeffrey J. Steltz. The clip assembly with two snap-engaging seats 110f of FIG. 4f is further described in connection with commonly-owned U.S. Pat. No. 10,018,214 to Fulvio Pacifico Yon. Additional suitable types of fasteners that can be used include those described in commonly-owned U.S. Pat. No. 6,305,055 to Dominique Castro, U.S. Pat. No. 6,974,292 to Wayne M. Hansen, U.S. Pat. No. 8,402,605 to Christian Courtin, U.S. Pat. No. 8,613,128 to Benjamin H. Moerke, U.S. Pat. No. 9,963,087 to Eric Leverger, U.S. Pat. No. 9,475,525 to Mark O. Lepper, and U.S. Pat. No. 9,982,694 to Derek Scroggie, as well as those described in U.S. Patent Publication No. 2020/0232495 to Mark O. Lepper.

Figure 5A:
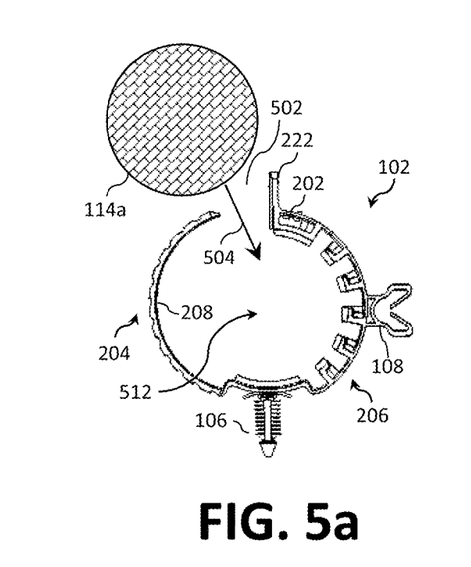
FIGS. 5a through 5f illustrated example process for loading and installing the ratcheting retainer.
Figure 5B:
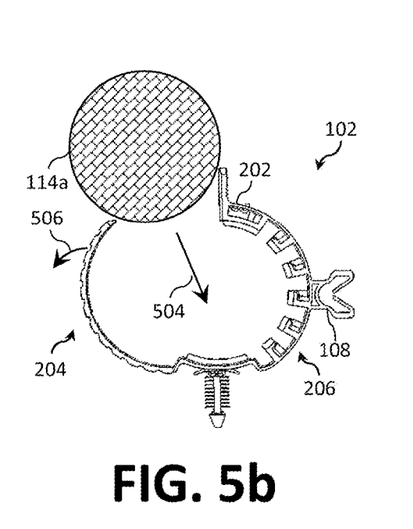
Figure 5C:
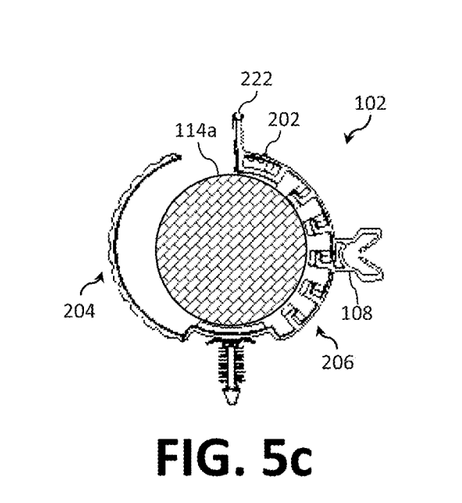
Figure 5D:
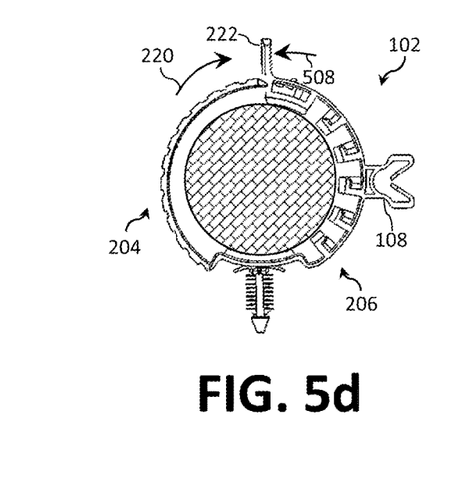
Figure 5E:
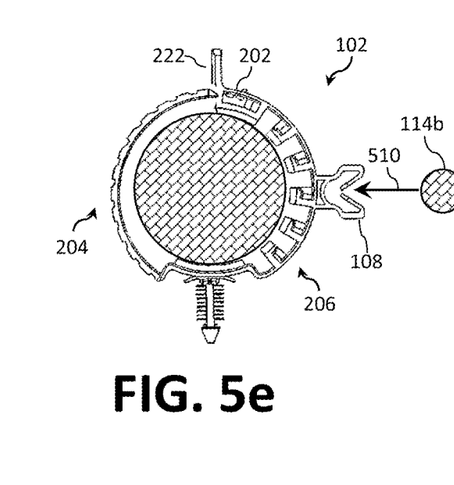
Figure 5F:
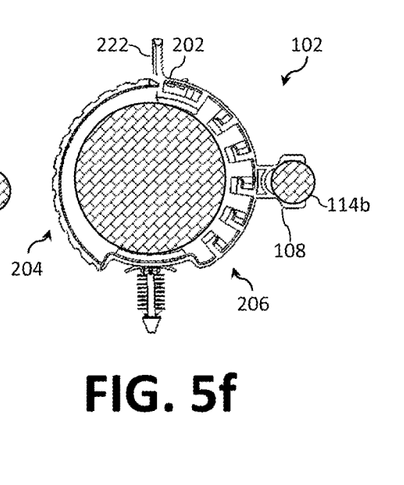

FIGS. 5a through 5f illustrate an example process for loading and installing the ratcheting retainer 102. FIG. 5a illustrates an initial step of assembly where, as illustrated, the ratcheting retainer 102 is in a relaxed, open position (i.e., the strap portion 204 is not yet inserted into the ring portion 206). The first object 114a approaches the gap 502 between the distal end of the strap portion 204 and the ring portion 206 in the direction indicated by arrow 504. With reference to FIG. 5b, the strap portion 204 can be pushed outwardly in the direction indicated by arrow 506 to enlarge the gap 502 between the strap portion 204 and the ring portion 206 to accommodate the first object 114a. The first object 114a is inserted into the strap opening 512 defined by the ratchet strap assembly 104 in the direction indicated by arrow 504 until the first object 114a is fully inserted into the strap opening 512 as illustrated in FIG. 5c. At FIG. 5d, the strap portion 204 and the ring portion 206 are pushed towards one another (e.g., via push tab 222) in the direction indicated by arrow 220 and arrow 508 to close the gap 502. The strap portion 204 is further inserted into the ring portion 206 and ratcheted until the ratchet strap assembly 104 is sized to fit and secure the first object 114a, which can be accomplished in a single handed motion. Turning to FIG. 5e, the second object approaches the retainer clip 108 in the direction indicated by arrow 510 until it is snapped into place as illustrated in FIG. 5f. The ratcheting retainer 102 can be attached to the component 110 via the fastener 106 after virtually any step depending on the installation location. For example, it may be desirable to secure the ratcheting retainer 102 to the first object 114a prior to attaching the ratcheting retainer 102 to the component 110 to enable the ratcheting retainer 102 to be more easily manipulated. Once the ratcheting retainer 102 and the first object 114a are assembled, the ratcheting retainer 102 can be attached to the component 110, after which the second object 114b can be inserted into the retainer clip 108.

The above-cited patents and patent publications are hereby incorporated by reference in their entirety. Where a definition or the usage of a term in a reference that is incorporated by reference herein is inconsistent or contrary to the definition or understanding of that term as provided herein, the meaning of the term provided herein governs and the definition of that term in the reference does not necessarily apply.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. For example, block and/or components of disclosed examples may be combined, divided, re-arranged, and/or otherwise modified. Therefore, the present method and/or system are not limited to the particular implementations disclosed. Instead, the present method and/or system will include all implementations falling within the scope of the appended claims, both literally and under the doctrine of equivalents.

The invention claimed is:

1. A ratcheting retainer comprising:
a ratchet strap assembly configured to define a strap opening to circumscribe and secure a first object, wherein the ratchet strap assembly comprises a strap portion, a ring portion, and a ratchet coupler configured to connect the strap portion and the ring portion and to adjust the ratchet strap assembly in diameter, and wherein the ring portion comprises a plurality of containment legs positioned on an inner surface thereof that are configured to receive and retain a free end of the strap portion;
a fastener coupled to the ratchet strap assembly and configured to secure the ratcheting retainer to a component; and
a retainer clip coupled to the ratchet strap assembly and configured to secure a second object to the ratchet strap assembly.

2. The ratcheting retainer of claim 1, wherein the fastener projects outwardly from the ratchet strap assembly.

3. The ratcheting retainer of claim 1, wherein the retainer clip projects outwardly from the ratchet strap assembly.

4. The ratcheting retainer of claim 1, wherein the fastener is a push-pin fastener.

5. The ratcheting retainer of claim 1, wherein the fastener is a W-type fastener.

6. The ratcheting retainer of claim 1, wherein the fastener is a box-prong fastener.

7. The ratcheting retainer of claim 1, wherein the fastener, the retainer clip, and the ratchet strap assembly are a unitary structure.

8. The ratcheting retainer of claim 7, wherein the fastener, the retainer clip, and the ratchet strap assembly are fabricated using an additive manufacturing technique.

9. The ratcheting retainer of claim 1, wherein each of the plurality of containment legs defines a passageway configured to receive and retain the free end so as to enable the strap portion to move during tightening of the ratchet strap assembly without becoming obstructed by the first object.

10. The ratcheting retainer of claim 9, wherein the ratchet coupler includes a push tab.

11. The ratcheting retainer of claim 9, wherein the ratchet strap assembly comprises a containment leg defining a passageway through which the strap portion can pass when assembled.

12. The ratcheting retainer of claim 11, wherein the containment leg is coupled to the ring portion.

13. The ratcheting retainer of claim 1, wherein the strap portion comprises a flex strap and a plurality of strap teeth formed in or on the flex strap.

14. The ratcheting retainer of claim 13, wherein the ratchet coupler is coupled to the ring portion and is configured to engage the plurality of strap teeth via a pawl.

15. The ratcheting retainer of claim 14, wherein the pawl includes at least one snap tooth configured to engage one or more of the plurality of strap teeth.

16. A ratcheting retainer comprising:
a ratchet strap assembly configured to define a recessed portion and a strap opening to circumscribe and secure a first object,
wherein the ratchet strap assembly is configured to adjust in diameter, and
wherein the recessed portion includes two spaced-apart protruding shoulders; and
a fastener coupled to the ratchet strap assembly and configured to secure the ratcheting retainer to a component, wherein the fastener is coupled to the ratchet strap assembly between the two spaced-apart protruding shoulders and projects outwardly from the ratchet strap assembly.

17. The ratcheting retainer of claim 16, wherein the fastener and the ratchet strap assembly are a unitary structure.

18. The ratcheting retainer of claim 17, wherein the ratchet strap assembly comprises a strap portion, a ring portion, and a ratchet coupler configured to connect the strap portion and the ring portion.

19. A ratcheting retainer comprising:
a ratchet strap assembly configured to define a strap opening to circumscribe and secure a first object,
wherein the ratchet strap assembly comprises a strap portion, a ring portion, and a ratchet coupler configured to connect the strap portion and the ring portion and to adjust the ratchet strap assembly in diameter, and
wherein the ring portion comprises a plurality of containment legs positioned on an inner surface thereof that are configured to receive and retain a free end of the strap portion.

20. The ratcheting retainer of claim 19, wherein each of the plurality of containment legs defines a passageway configured to receive and retain the free end so as to enable the strap portion to move during tightening of the ratchet strap assembly without becoming obstructed by the first object.

* * * * *